United States Patent

Grünert et al.

[11] 4,356,020
[45] Oct. 26, 1982

[54] FERTILIZER COMPOSITIONS CONTAINING ALKYLENE OXIDE ADDUCT ANTICAKING AGENTS

[75] Inventors: Margarete Grünert, Kaarst; Holger Tesmann, Düsseldorf, both of Fed. Rep. of Germany

[73] Assignee: Henkel Kommanditgesellschaft auf Aktien, Düsseldorf-Holthausen, Fed. Rep. of Germany

[21] Appl. No.: 323,439

[22] Filed: Nov. 20, 1981

[30] Foreign Application Priority Data

Nov. 29, 1980 [DE] Fed. Rep. of Germany ....... 3045131

[51] Int. Cl.³ .............................................. C05G 3/00
[52] U.S. Cl. ...................................... 71/27; 71/64.07; 71/64.12; 423/268; 252/392; 427/220
[58] Field of Search ...................... 71/1, 11, 27, 64.07, 71/64.12; 423/265, 268; 252/383, 384, 392; 427/212, 220

[56] References Cited

U.S. PATENT DOCUMENTS

| | | | |
|---|---|---|---|
| 3,954,436 | 5/1976 | Vad et al. | 71/27 |
| 4,105,430 | 8/1978 | Koch et al. | 71/64.12 X |
| 4,163,657 | 8/1979 | Koslow et al. | 71/27 |

FOREIGN PATENT DOCUMENTS 7305601  1/1974  Netherlands ........................ 71/64.12

474128  11/1975  U.S.S.R. ............................. 71/64.12

Primary Examiner—S. Leon Bashore, Jr.
Assistant Examiner—Ferris H. Lander
Attorney, Agent, or Firm—Hammond & Littell, Weissenberger and Muserlian

[57] ABSTRACT

This invention relates to fertilizer compositions containing alkylene oxide anticaking agents. More particularly, this invention relates to a method of decreasing the caking during storage in a hygroscopic salt or fertilizer which normally cakes on storage, which comprises uniformly admixing with said hygroscopic salt or fertilizer an effective amount of an anticaking agent consisting of one or more compounds selected from the group consisting of adducts of from 6 to 15 mols of ethylene oxide and/or propylene oxide onto 1 mol of a β-hydroxyalkyl-diethanolamine of the formula

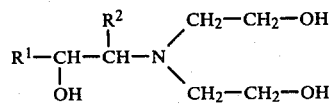

wherein $R^1$ is an alkyl of from 1 to 18 carbon atoms and $R^2$ is hydrogen or alkyl of from 1 to 16 carbon atoms, the sum of the carbon atoms in $R^1$ and $R^2$ being from 8 to 18.

6 Claims, No Drawings

FERTILIZER COMPOSITIONS CONTAINING ALKYLENE OXIDE ADDUCT ANTICAKING AGENTS

FIELD OF THE INVENTION

This invention relates to fertilizer compositions containing anticaking agents. More particularly, this invention relates to the use of ethylene oxide and/or propylene oxide adducts of certain β-hydroxyalkylamines as anticaking agents for fertilizer salts or fertilizer salt mixtures.

BACKGROUND OF THE INVENTION

Many inorganic salts and oxides, among them components of mixed fertilizers such as potassium chloride and the nitrogenous salts (ammonium nitrate, ammonium sulfate, sodium nitrate, and diammonium phosphate) are hygroscopic and therefore tend to cake or coalesce when stored, particularly at elevated humidity, temperature, and pressure. Materials of this type are not suitable for storage in bulk since after such storage they cannot be spread readily by mechanical spreaders.

To reduce caking, hygroscopic materials of this type (including fertilizers) are produced in the form of granulates of uniform size which are coated, or dusted, with talcum, kieselguhr, diatomaceous earth, or chalk to prevent absorption of moisture. However, since according to these methods relatively large amounts of one or more of these anticaking agents must be added, considerable dust is developed when the coated particles are spread. Also, when the base material is a fertilizer, its nutrient content is reduced.

It is known from U.S. Pat. No. 2,480,694, incorporated herein by reference, that fatty amines and their derivatives prevent the caking of fertilizers. Solutions of fatty amines in mineral oil and the spraying of these solutions on fertilizers are described in U.S. Pat. No. 3,186,828, incorporated herein by reference. In general, fatty amines—including fatty diamines—which contain a fatty radical of from 8 to 22 carbon atoms, as well as their salts, particularly the acetates and chlorides, and their ethoxylates, are used. However, these methods and products have the disadvantage that the anticaking effect achieved with fatty amines and their derivatives is not satisfactory. Also, since the fatty amines or their derivatives tend to be solids at the normal temperatures at which they are used in this regard, they have to be melted or dissolved in solvent for use. The use of solvents, particularly mineral oils, is no longer practical due to environmental impact considerations. Furthermore, the fatty amines or their derivatives are not harmless because of their strong amine odor and their tendency to irritate the eyes and skin.

The vicinal aminoalkanols disclosed in U.S. Pat. No. 4,105,430, incorporated herein by reference, as anticaking agents are essentially free from the above-mentioned disadvantages associated with fatty amines and derivatives thereof. However, in practice the anticaking activity of these vicinal aminoalkanols is not entirely satisfactory.

OBJECTS OF THE INVENTION

It is an object of the invention to provide a hygroscopic salt material in free-flowing, particulate form with a surface content of a material which will inhibit the tendency of said particles to cake on storage.

It is also an object of the invention to provide such a composition wherein the anticaking component is effective when present in a very minor amount.

It is a further object of the invention to provide such a composition wherein the anticaking composition has no perceptible effect upon the ecology, is substantially odorless, and is relatively harmless from a dermatological point of view.

It is a yet further object of the invention to provide anticaking for fertilizers comprising the addition thereto of adducts of from 6 to 15 mols of ethylene oxide and/or propylene oxide onto 1 mol of β-hydroxyalkyl-diethanolamines of the formula

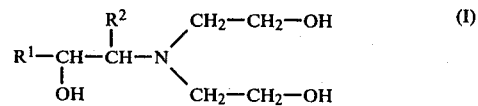

wherein $R^1$ is an alkyl of from 1 to 18 carbon atoms and $R^2$ is hydrogen or an alkyl of from 1 to 16 carbon atoms, the sum of the carbon atoms in $R^1$ and $R^2$ being from 8 to 18.

These and other objects of the invention will become more apparent in the discussion below.

DETAILED DESCRIPTION OF THE INVENTION

It has now been found that certain ethylene oxide and/or propylene oxide adducts onto β-hydroxyalkylamines do not have the disadvantages associated with fatty amines and derivatives thereof and that, furthermore, they exhibit anticaking activity considerably better than that of vicinal aminoalkanols. Accordingly, the subject matter of this invention is the use of adducts of from 6 to 15 mols of ethylene oxide and/or propylene oxide onto 1 mol of a β-hydroxyalkyl-diethanolamine of the formula

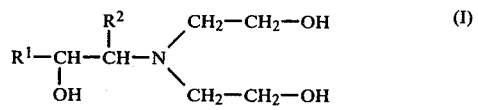

wherein $R^1$ is an alkyl of from 1 to 18 carbon atoms and $R^2$ is hydrogen or an alkyl of from 1 to 16 carbon atoms, the sum of the carbon atoms in $R^1$ and $R^2$ being from about 8 to 18.

The β-hydroxyalkylamines of Formula I used as starting materials for the preparation of the adducts to be used according to the invention, are usually mixtures of such compounds. The compounds are advantageously obtained in known manner by reaction of diethanolamine with mixtures of epoxides of the formula

wherein $R^1$ and $R^2$ are as defined above.

The epoxides of Formula II can in turn be prepared from mixtures of corresponding mono-olefins having terminal or non-terminal double bonds. Useful olefin mixtures can be obtained through catalytic dehydrogenation or through chlorination and subsequent dehydrochlorination of linear paraffin hydrocarbons with from 10 to 20 carbon atoms and selective extraction of the mono-olefins. These mono-olefins contain mainly non-terminal double bonds, which bonds are randomly distributed along the carbon chain. In addition, useful mixtures of olefins having linear hydrocarbon chains of from 12 to 20 carbon atoms can be prepared alumino-chemically according to the Ziegler Process. Such olefin mixtures contain a high proportion of olefins with terminal double bonds. For the preparation of epoxides of Formula II, commercial olefin fractions of, for example, the following chain length distributions are suitable:

(a) $C_{11-14}$-fraction
| | |
|---|---|
| $C_{11}$, non-terminal | approx. 22% by weight |
| $C_{12}$, non-terminal | approx. 30% by weight |
| $C_{13}$, non-terminal | approx. 26% by weight |
| $C_{14}$, non-terminal | approx. 22% by weight |

(b) $C_{15-18}$-fraction
| | |
|---|---|
| $C_{15}$, non-terminal | approx. 26% by weight |
| $C_{16}$, non-terminal | approx. 35% by weight |
| $C_{17}$, non-terminal | approx. 31% by weight |
| $C_{18}$, non-terminal | approx. 6% by weight |

(c) $C_{14-16}$-fraction
| | |
|---|---|
| $C_{14}$, terminal | approx. 53% by weight |
| $C_{16}$, terminal | approx. 28% by weight |
| $C_{14}$, non-terminal | approx. 7% by weight |
| $C_{16}$, non-terminal | approx. 11% by weight |

Additional olefin fractions are mentioned below in the experimental section.

The mono-olefin mixtures described above are converted to the corresponding epoxide mixtures of Formula II in known manner, for example, with peracids, such as peracetic acid. The β-hydroxyalkylamine mixtures of Formula I can be obtained from the mixtures of Formula II by reaction with diethanolamine at elevated temperature and optionally at elevated pressure.

The products to be used according to the invention as anticaking agents are obtained from the compounds of Formula I by reaction with the appropriate number of mols of ethylene oxide and/or propylene oxide under known alkoxylation conditions.

Due to their relatively low flow or solidification points, generally below about 20° C., the adducts to be used according to the invention can be easily applied directly on the salt or fertilizer composition by mixing said adduct and said salt or fertilizer composition in a suitable mixing apparatus, for example, in a rotary drum mixer or screw conveyer mixer, and can thus be distributed evenly on the particles. They can also be applied as solutions in organic solvents or water, in which case the adducts used according to the invention will be present in solution in amounts of from about 25 to 100% by weight, based upon the weight of the organic solvent or water.

The amount of anticaking agent according to the invention that is necessary to significantly decrease the caking properties of salts and fertilizers is very small. It ranges from 0.005 to 0.2% by weight, based upon the weight of the fertilizer or salt.

A suitable amount of the anticaking agent can be determined in any instance by making a series of trials with increasing amounts of agent within the range mentioned.

The use of the products according to the invention as anticaking agents is described more fully below on the basis of examples. These examples are merely illustrative, and are not to be construed in limitation of the invention.

EXAMPLES

Ethylene oxide and/or propylene oxide adducts of β-hydroxyalkylamines designated as 1 and 2, respectively, were tested as compounds to be used according to the invention. The β-hydroxyalkylamine 1 was obtained by reacting diethanolamine with a mixture of linear $C_{12-14}$-olefin epoxides, which in turn was prepared from an olefin fraction having the following chain length distribution:

| Fraction | Approx. % by Weight |
|---|---|
| $C_{12}$, terminal | 55 |
| $C_{14}$, terminal | 31 |
| $C_{12}$, non-terminal | 5 |
| $C_{14}$, non-terminal | 8 |

The β-hydroxyalkylamine 2 resulted from a reaction of diethanolamine with a mixture of linear $C_{16-20}$-olefin epoxides, which in turn was prepared from an olefin fraction having the following chain length distribution:

| Fraction | Approx. % by Weight |
|---|---|
| $C_{16}$, terminal | 35 |
| $C_{18}$, terminal | 23 |
| $C_{20}$, terminal | 2 |
| $C_{16}$, non-terminal | 11 |
| $C_{18}$, non-terminal | 21 |
| $C_{20}$, non-terminal | 5 |

The β-hydroxyalkylamines 1 and 2 were reacted in conventional manner at elevated pressure and elevated temperature in the presence of basic alkoxylation catalysts with ethylene oxide and/or propylene oxide to obtain the products A to H to be used according to the invention. In the table below these products are represented by the starting β-hydroxyalkylamines 1 and 2, the particular alkylene oxide employed (EO=ethylene oxide; PO=propylene oxide), the number of mols of alkylene oxide which are reacted with 1 mol of β-hydroxyalkylamine, and the solidification point.

If both ethylene oxide and propylene oxide were added, they were added sequentially analogously to the order set forth in the table.

TABLE 1

| Product | β-Hydroxy-alkylamine | Alkylene Oxide added per mol | Solidification Point (°C.) |
|---|---|---|---|
| A | 1 | 9 EO | −32 |
| B | 1 | 12 EO | −31 |
| C | 1 | 9 PO | −31 |
| D | 1 | 4 EO + 4 PO | −40 |
| E | 1 | 4 PO + 4 EO | −42 |
| F | 2 | 9 EO | +8 |
| G | 2 | 15 EO | 0 |
| H | 2 | 12 PO | −35 |

To provide a comparison, the following compounds were also employed:
(I) Coconut amine ($C_{12}$–$C_{14}$-alkyl); solidification point: 15° C.; setting point: 16° C.;
(J) Tallow amine ($C_{16}$–$C_{18}$-alkyl and $C_{16}$–$C_{18}$-alkylene); setting point: 25°–30° C.;
(K) Coconut amine hydrochloride; setting point: approx. 100° C. (powder);
(L) Stearylamine acetate; setting point: approx. 55°–65° C. (granulate);

(M) Adduct from coconut amine and 10 mols ethylene oxide; solidification point: 0° C.;

(N) N-β-Hydroxy-C$_{12-14}$-alkyl-ethylenediamine, prepared from an α-C$_{12-14}$-olefinepoxide mixture and ethylenediamine;

(O) N-β-Hydroxy-C$_{16-18}$-alkyl-ethylenediamine, prepared from an α-C$_{16-18}$-olefinepoxide mixture and ethylenediamine; and (P) Bis-(β'-hydroxyethyl)-β-hydroxy-C$_{12-14}$-alkylamine, prepared from an α-C$_{12-14}$-olefinepoxide mixture and diethanolamine.

The anticaking activity of the products according to the invention and of the comparative substances was tested on the following substrates:

(a) potassium chloride, 100% by weight; and
(b) N-P-K fertilizer.

The N-P-K fertilizer had the following composition:

| Component | % by Weight |
|---|---|
| K$_2$SO$_4$ | 32.6 |
| NH$_4$H$_2$PO$_4$ | 25.0 |
| Urea | 9.4 |
| (NH$_4$)$_2$SO$_4$ | 33.0 |

To prepare the N-P-K fertilizer, the components were dried and sieved (0.8 to 1.0 mm) and then mixed in a Loedige mixer for 20 minutes.

Testing Procedure

The anticaking agents are added to the fertilizer salts in liquid, granulate, or powder form in amounts of 0.1 or 0.01% by weight, based upon the weight of the fertilizer or salt. Subsequently the resulting mixture is mixed in a Loedige mixer for 5 minutes. When the anticaking agent to be tested is a solid at room temperature, the mixing process is carried out at a temperature above the melting point of the particular anticaking agent.

In each test run 100 gm of treated fertilizer or salt are placed in a glass test tube (44 mm in diameter and 100 mm long, with roughened inner surface), at the bottom of which is placed an anchor disc (15 mm in diameter). The substance to be tested is then compressed for 30 minutes under a polyvinyl chloride plunger loaded with a weight of approximately 10 kg. Then, the force required to pull out the anchor disc is measured, which measurement corresponds to the anticaking action of the anticaking agents. By comparison of the above measurement with the force necessary to pull the anchor disc out of untreated fertilizer or salt, an index for the efficacy of the tested anticaking agents is obtained. The smaller the force required to pull out the anchor disc, the smaller is the tendency of the salt or fertilizer to cake and the better is the efficacy of the anticaking agent.

EXAMPLE 1

First the respective control values for untreated potassium chloride and N-P-K fertilizer substrates were determined according to the method described above. Then, fertilizer samples which had each been treated with 0.1% by weight of the compounds A to P, based upon the weight of the substrate, were tested. The results obtained are set forth in the following table:

TABLE 2

| Anticaking Agent | Potassium Chloride Force (gm) | % Relative to control | N—P—K Fertilizer Force (gm) | % Relative to control |
|---|---|---|---|---|
| —* | 1240 | 100 | 1000 | 100 |
| A | 340 | 27 | 510 | 51 |
| B | 340 | 27 | 510 | 51 |
| C | 360 | 29 | 330 | 33 |
| D | 350 | 28 | 300 | 30 |
| E | 450 | 36 | 350 | 35 |
| F | 360 | 29 | 470 | 47 |
| G | 400 | 32 | 450 | 45 |
| H | 360 | 29 | 450 | 45 |
| I** | 390 | 31 | 510 | 51 |
| J** | 480 | 39 | 330 | 33 |
| K** | 500 | 40 | 910 | 91 |
| L** | 170 | 14 | 690 | 69 |
| M** | 400 | 32 | 750 | 75 |
| N** | 430 | 35 | 930 | 93 |
| O** | 460 | 37 | 510 | 51 |
| P** | 410 | 33 | 860 | 86 |

*Control
**Comparison

EXAMPLE 2

Fertilizer and salt samples which had been treated with 0.01% by weight of the compounds B to H, I, and L, based upon the weight of the substrate, were tested. The test results were as follows:

TABLE 3

| Anticaking Agent | Potassium Chloride Force (gm) | % Relative to control | N—P—K Fertilizer Force (gm) | % Relative to control |
|---|---|---|---|---|
| —* | 1240 | 100 | 1000 | 100 |
| B | 450 | 36 | 900 | 90 |
| C | 730 | 59 | 720 | 72 |
| D | 450 | 36 | 420 | 42 |
| E | 420 | 34 | 860 | 86 |
| F | 550 | 44 | 820 | 82 |
| G | 570 | 46 | 390 | 39 |
| H | 450 | 36 | 1100 | 110 |
| I** | 605 | 49 | 760 | 76 |
| L** | 440 | 35 | 1150 | 115 |

*Control
**Comparison

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method of decreasing the caking during storage in a hygroscopic salt or fertilizer which normally cakes on storage, which comprises uniformly admixing with said hygroscopic salt or fertilizer an effective anticaking amount of an anticaking agent consisting of one or more compounds selected from the group consisting of adducts of from 6 to 15 mols of ethylene oxide and/or propylene oxide onto 1 mol of a β-hydroxyalkyl-diethanolamine of the formula wherein R$^1$ is an alkyl of from 1 to 18 carbon atoms and R$^2$ is hydrogen or alkyl of from 1 to 16 carbon atoms, the sum of the carbon atoms in R$^1$ and R$^2$ being from 8 to 18.

2. The method of claim 1, wherein from 0.005 to 0.2% by weight of anticaking agent, based upon the weight of the hygroscopic salt or fertilizer, is used.

3. A composition in particulate, free-flowing form consisting essentially of a hygroscopic fertilizer or salt component which normally cakes on storage having a uniformly distributed, effective surface content as anticaking agent of from about 0.005 to 0.2% by weight, based upon the weight of the hygroscopic fertilizer or salt component, of one or more compounds selected from the group consisting of adducts of from 6 to 15 mols of ethylene oxide and/or propylene oxide onto 1 mol of β-hydroxyalkyl-diethanolamine of the formula wherein $R^1$ is an alkyl of from 1 to 18 carbon atoms and $R^2$ is hydrogen or alkyl of from 1 to 16 carbon atoms, the sum of the carbon atoms in $R^1$ and $R^2$ being from 8 to 18.

4. The composition of claim 3, wherein the anticaking agent comprises one or more compounds selected from the group consisting of adducts of from 6 to 15 mols of ethylene oxide onto 1 mol of the β-hydroxyalkyl-diethanolamine.

5. The composition of claim 3, wherein the anticaking agent comprises one or more compounds selected from the group consisting of adducts of from 6 to 15 mols of propylene oxide onto 1 mol of the β-hydroxyalkyl-diethanolamine.

6. The composition of claim 3, wherein the anticaking agent comprises one or more compounds selected from the group consisting of adducts of from 6 to 15 mols of ethylene oxide and from 6 to 15 mols of propylene oxide onto 1 mol of the β-hydroxyalkyl-diethanolamine.

* * * * *

UNITED STATES PATENT AND TRADEMARK OFFICE
CERTIFICATE OF CORRECTION

PATENT NO. : 4,356,020
DATED : October 26, 1982
INVENTOR(S) : Margarete Grünert et al.

It is certified that error appears in the above-identified patent and that said Letters Patent is hereby corrected as shown below:

Column 6, claim 1, between lines 59 and 60, and Column 7, claim 3, between lines 7 and 8, insert the following:

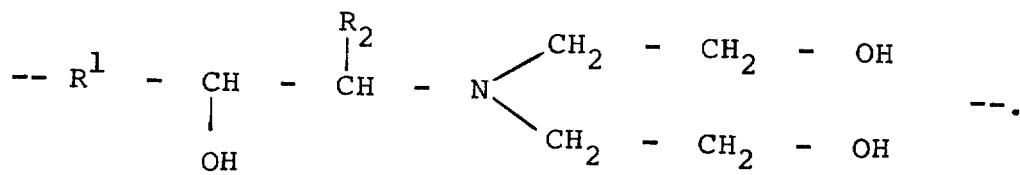

Signed and Sealed this

Eighteenth Day of January 1983

[SEAL]

Attest:

GERALD J. MOSSINGHOFF

Attesting Officer    Commissioner of Patents and Trademarks